United States Patent
Smashey et al.

[11] Patent Number: 6,049,060
[45] Date of Patent: Apr. 11, 2000

[54] METHOD FOR WELDING AN ARTICLE AND TERMINATING THE WELDMENT WITHIN THE PERIMETER OF THE ARTICLE

[75] Inventors: Russell W. Smashey, Loveland; John H. Snyder, Fairfield, both of Ohio; Eric J. Boerger, Fort Mitchell; Bruce L. Borne, Florence, both of Ky.

[73] Assignee: General Electric Company, Cincinnati, Ohio

[21] Appl. No.: 09/210,879

[22] Filed: Dec. 15, 1998

[51] Int. Cl.⁷ ....................................................... B23K 9/00
[52] U.S. Cl. ........................ 219/137 R; 228/119; 228/222
[58] Field of Search ...................... 219/137 R, 137 WM, 219/136, 61, 75; 228/119, 214, 222

[56] References Cited

U.S. PATENT DOCUMENTS

| | | | |
|---|---|---|---|
| 1,512,787 | 10/1924 | Morton | 219/137 R |
| 2,649,528 | 8/1953 | Koenig et al. | 219/137 R |
| 2,682,598 | 6/1954 | Macoy | 219/61 |
| 4,046,988 | 9/1977 | Okuda et al. | 219/137 R |
| 4,170,473 | 10/1979 | Gerken | 219/137 R |
| 5,897,801 | 4/1999 | Smashey et al. | 219/137 WM |

OTHER PUBLICATIONS

"Low Cycle Fatigue Properties of LPM™ Wide–Gap Repairs in Inconel 738" by KA Ellison, J Liburdi, JT Stover, *Superalloys* 1996 pp. 763–771.

*Primary Examiner*—Clifford C. Shaw
*Attorney, Agent, or Firm*—Andrew C. Hess; David L. Narciso

[57] ABSTRACT

An article is welded, as in weld repair of a defect, by positioning a weld lift-off block at a location on the surface of the article adjacent to the intended location of the end of the weldment on the surface of the article. The weld lift-off block has a wedge shape including a base contacting the surface of the article, and an upper face angled upwardly from the base from a base leading edge. A weld pool is formed on the surface of the article by directly heating the surface of the article using a heat source. The heat source is moved relative to the surface of the article and onto the upper surface of the weld lift-off block by crossing the leading edge of the wedge, without discontinuing the direct heating of the article by the heat source. The heating of the article with the heat source is discontinued only after the heat source is directly heating the upper face of the weld lift-off block, and not the article.

15 Claims, 4 Drawing Sheets

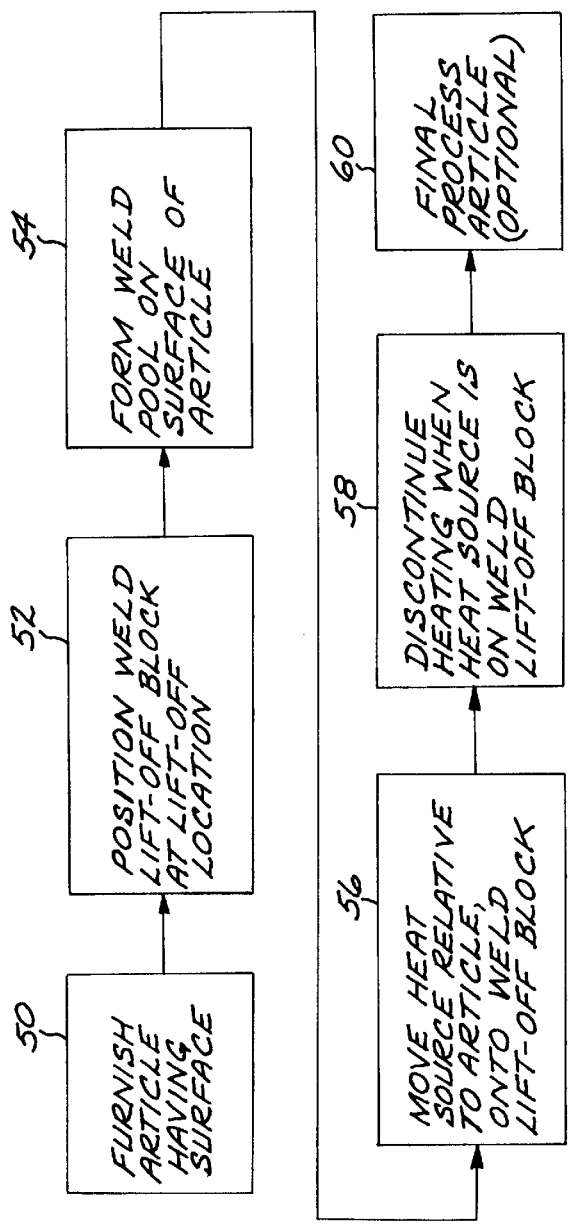
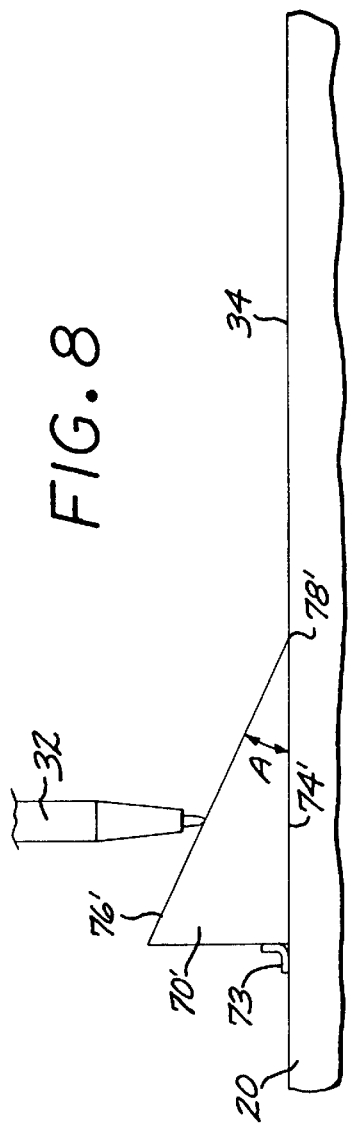

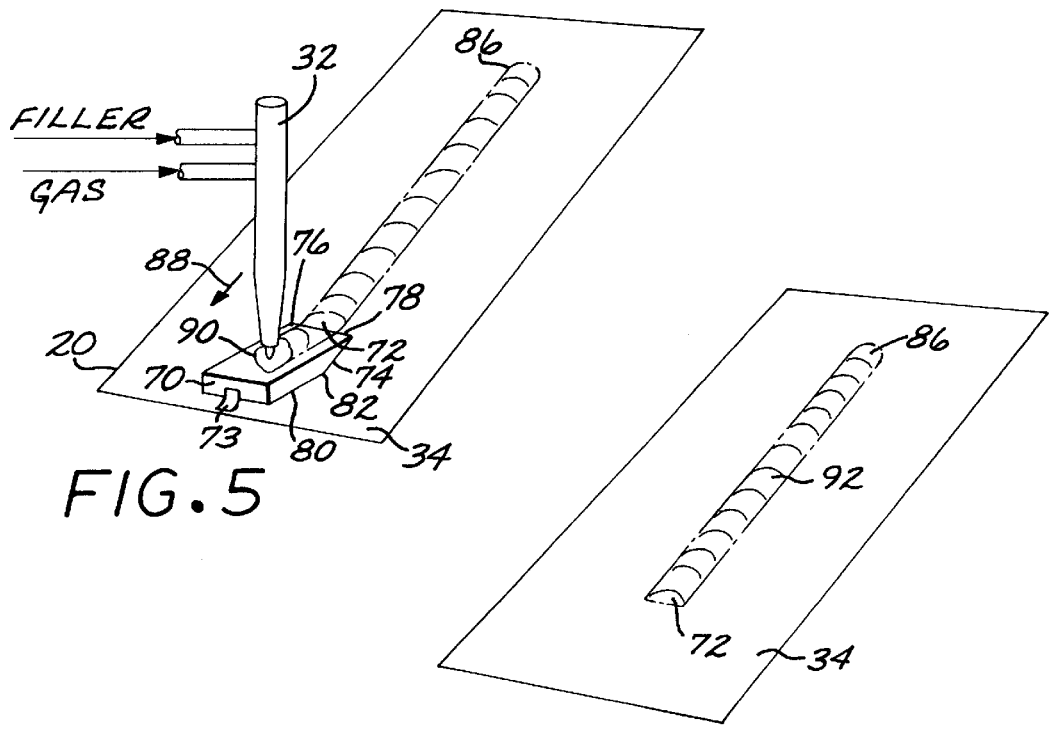
FIG. 5
FIG. 7
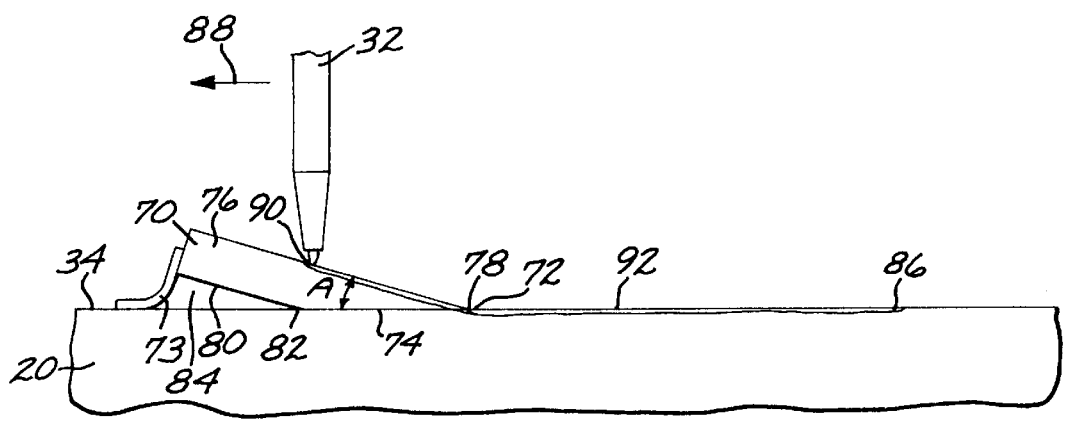
FIG. 6

METHOD FOR WELDING AN ARTICLE AND TERMINATING THE WELDMENT WITHIN THE PERIMETER OF THE ARTICLE

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to welding, and, more particularly, to weld repair wherein the weldment must be terminated within the perimeter ol the article being welded.

It is not uncommon that some articles experience cracking during fabrication or during service. For example, aircraft engine parts may experience cracking during service as a result of applied strains and thermal strains. In addition, parts made of certain alloys, particularly those having low ductilities at temperatures just below the melting point, have a tendency to exhibit through-wall cracking during the initial casting fabrication.

If the surface cracks are not overly severe, they may be repaired by welding. Welding as used in this context means that the cracked material is first removed, usually by grinding. The resulting void is then refilled with molten metal. Upon cooling, the molten metal solidifies so that the crack is filled with solid metal, termed the weldment, and thence is repaired. Extra "filler" metal, usually but not necessarily of the same composition as the base metal of the article, is supplied to the molten region to aid in filling the crack.

The weld repair process generally works well along most of the region of the crack. However, it is sometimes found that the weld repair process induces further cracking of the article, particularly at locations near the point of termination of the weldment. These repair-induced cracks are usually smaller than the original crack that was to be repaired, but are still troublesome and must be repaired.

A typical further repair procedure for the repair-induced cracks is to cap weld over these cracks with a lower-melting-temperature, weak filler material, and then to hot isostatically press the cap-welded region. Another further repair procedure is to fill the repair-induced cracks with a filler metal such as a powder, and then hot isostatically press the article. These repair procedures are suited for the repair of the small repair-induced cracks, but not of the original larger crack. The repair procedures, while operable, are expensive and may introduce material of a foreign composition into the article, as in the case of the cap weld procedure.

There is a need for an improved approach to the weld repair of articles with surface cracks. The present invention fulfills this need, and further provides related advantages.

SUMMARY OF THE INVENTION

The present invention provides a welding process, usefully applied for weld repair, that reduces the incidence of cracking associated with the welding operation. In the weld repair context, there is less cracking at the termination point of the weldment, sometimes termed the "lift-off point", than in prior welding processes. The present approach may be used in a wide variety of welding applications, and is particularly useful in those where the lift-off point is within the periphery of the article. The welded article may be at room temperature (away from the welded region), or may be heated, when the weld repair is performed. The weld procedure may be accomplished manually or with automated equipment.

In accordance with the invention, a method of forming a weldment that terminates within the perimeter of an article comprises the steps of furnishing an article having a surface, and positioning a weld lift-off block at a location on the surface of the article. The weld lift-off block has a wedge shape comprising a base contacting the surface of the article, and an upper face angled upwardly from the base from a base leading edge. The method further includes forming a weld pool on the surface of the article by directly heating the surface of the article using a heat source, translating the heat source relative to the surface of the article and onto the upper surface of the weld lift-off block by crossing the leading edge of the wedge, without discontinuing the direct heating of the article by the heat source, and thereafter discontinuing the heating of the article with the heat source only after the heat source is directly heating the upper face of the weld lift-off block, and not the article.

In this approach, the direct heating during the welding procedure is terminated on the upper face of the weld lift-off block, which is separate from the article. Most cracks associated with the lift-off of the heat source are confined to the upper face of the weld lift-off block, and are therefore harmless because they are not in the article itself. In most cases, the weldment is started at a location separated from the base leading edge of the weld lift-off block, and the heat source is translated relative to the surface of the article, usually parallel to the surface, until it reaches the base leading edge. The heat source is then moved across the leading edge such that thereafter the upper face of the weld lift-off block is directly heated. The weld lift-off block is preferably made of a material that has a melting point not substantially less than that of the article being welded, so that it is not melted onto the surface of the article during the final stages of welding. The weld lift-off block is normally affixed to the surface of the article by a retainer, such as a tack-welded strip, so that it does not move during the welding operation.

The present approach significantly decreases the number and size of surface cracks associated with the welding operation, and in man) cases there are no such cracks. If any such repair-induced cracks remain, either on the front (welded) side or the back side of the article, they may be repaired with known techniques suitable for repairing small cracks, such as powder-filler methods. The present approach may be used with a wide variety of heat sources, such as, for example, electric arc sources, gas torches, and lasers.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a block flow diagram of a preferred approach for practicing the present invention;

FIG. 5 is a perspective view of the present approach for weld repair of the surface crack of FIG. 1;

FIG. 6 is a side elevational view of the approach depicted in FIG. 5;

FIG. 7 is a perspective view of a portion of the article repaired according to the approach of FIGS. 5 and 6;

FIG. 8 is a side elevational view of another embodiment of the weld lift-off block shown in FIG. 6.

DETAILED DESCRIPTION OF THE INVENTION

Figure 1:
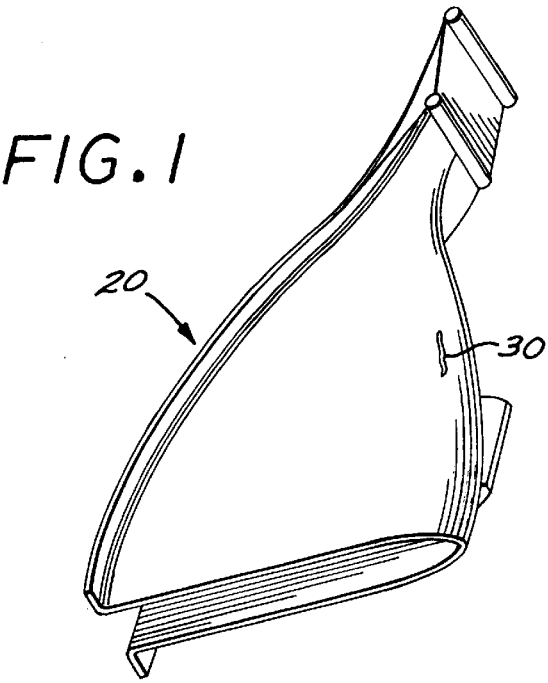
FIG. 1 is a perspective view of an article having a surface crack therein.

FIG. 1 depicts an example of a component article 20 of an aircraft gas turbine engine which may be repaired according to the approach of the invention. This article 20 is illustrated as a mixer used in an exhaust gas diffuser, but it may be any other operable article.

Either during fabrication or during service of the article 20, a crack 30 may be formed in the article. If the crack 30 cannot be repaired, it would be necessary to scrap the article. If the crack 30 is not overly aide, it may be possible to repair the article by closing the crack 30 using a welding procedure.

Figure 2:
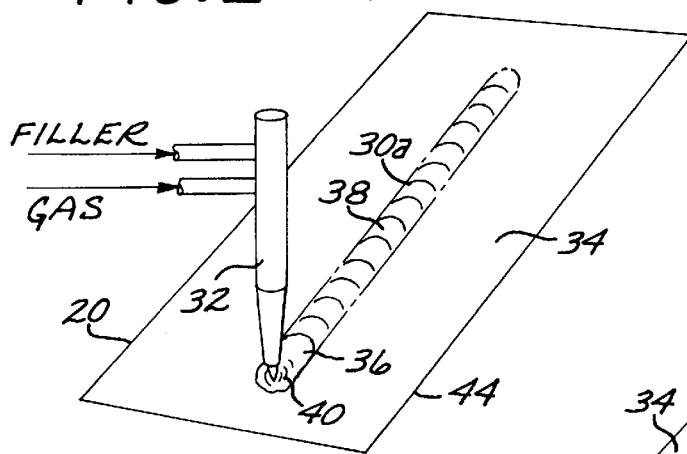
FIG. 2 is a perspective view of a conventional approach for weld repair of the surface crack of FIG. 1.

FIG. 2 illustrates a conventional approach for the weld repair of the crack 30. First, some material at the surface of the crack 30 is removed, typically by grinding, leaving a void 30a to be filled by weld repair. The void 30a is comparable in shape to the crack 30, but somewhat larger due to the removal of material. A heat source 32 is positioned adjacent to a surface 34 of the article 20, so that the heat source heats and melts the base metal of the article 20 immediately adjacent to the void 30a. The heat source 32 may be of any operable type, such as electric arc sources, gas torches, or lasers. The illustrated heat source 32 is a preferred gas tungsten arc source, in which an electric arc is struck between an electrode in the heat source and the article to be repaired. This electric arc locally melts the surface 34 in and around the void 30a. An inert gas is fed down the barrel of the heat source, emerging to surround the arc to prevent excessive oxidation. Optionally but preferably as shown, a powdered (or wire) filler metal, typically of the same composition as the base metal of the article being repaired, is fed through the heat source (or separately from the heat source) to deposit into the molten weld pool 36. The heat source is translated along the surface 34, following the void 30a. The base metal of the article 20 along and in the cracked region is progressively melted to form the weld pool 36, and filled with the filler metal. As the heat source 32 moves on, the weld pool 36 solidifies in its trail as the weldment 38 that serves as the repair for the original crack 30.

When the heat source 32 reaches the end of the void 30a, it is raised away from the surface 34 to terminate the welding portion of the repair procedure, giving this end point the name "lift-off region" 40. The lift-off region 40 is typically within a perimeter 44 of the surface 34 of the article being repaired. That is, the void 30a typically does not extend to the edge of the article 20.

Figure 3:
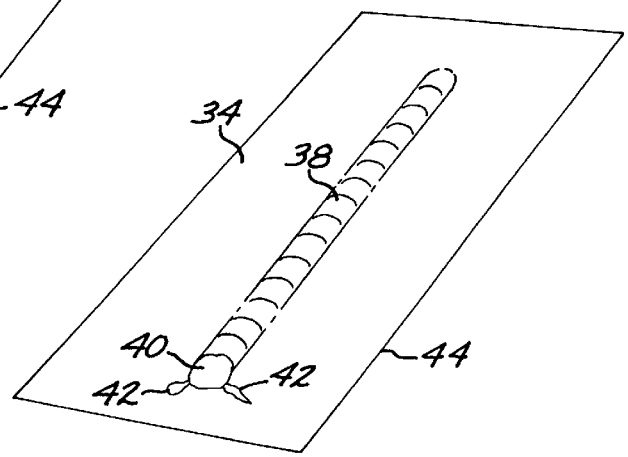
FIG. 3 is a perspective view of a portion of the article repaired according to the approach of FIG. 2.

As shown in FIG. 3, new cracks, termed repair-induced cracks 42, are often observed in the weldment 38 and the base metal adjacent to the lift-off region 40. These repair-induced cracks 42 are typically smaller than the original crack 30 that was repaired, but are still troublesome and must be further repaired. The present invention is concerned with reducing the incidence of such weld-induced cracks, and achieving a better repair of the original crack 30.

A preferred approach for practicing the present invention is illustrated in FIG. 4. An article to be welded, such as the article 20 having the surface 34, is furnished, numeral 50. In the preferred application of the invention, the article 20 is made of a nickel-base alloy (superalloy) such as Rene' 108, having a nominal composition, in weight percent, of 9.4 percent cobalt, 8.2 percent chromium, 0.5 percent molybdenum, 9.5 percent tungsten, 3.2 percent tantalum, 5.6 percent aluminum, 0.7 percent titanium, 1.5 percent hafnium, 0.1 percent carbon, 0.015 percent boron, balance (about 62.9 percent) nickel. The application of the invention is not limited to this alloy, and is more broadly applicable to a wide range of metallic materials, such as, for example, cobalt-base alloys, iron-base alloys, titanium-base alloys, or intermetallic materials such as titanium aluminides. The material forming the article 20 is sometimes termed the "base metal".

Base metal at the surface of the crack 30 is removed, typically by grinding, leaving the void 30a comparable in shape to the crack 30, but somewhat larger due to the removal of base metal, to be filled.

A weld lift-off block 70 is furnished and positioned at an effective article lift-off region 72, numeral 52. The weld lift-off block may be temporarily affixed to the surface 34 of the article 20 using a strip 73 that is tack welded to the weld lift-off block 70 and to the surface 34, and then removed after the weld repair is completed. The weld lift-off block 70 is preferably made of a material having a melting point that is not substantially less than that of the article 20 being welded. That is, the melting point of the material of construction of the weld lift-off block is preferably equal to or greater than that of the base metal of the article 20. The melting point of the weld lift-off block may be slightly less than that of the base metal, but not more than about 100° F. lower. The weld lift-off block 70 is also preferably made of a material having a composition close to that of the article being welded, so that there is no contamination of the article due to any incidental melting of the weld lift-off block during the following procedure.

The weld lift-off block 70 and its positioning in relation to the surface 34 and the void 30a are shown in FIGS. 5 and 6. The weld lift-off block 70 is generally wedge shaped, and includes a base 74 contacting the surface 34 of the article. An upper face 76 is angled upwardly from the base 74 from a base leading edge 78. The angle A between the upper face 76 and the base 74 is preferably about 45 degrees, but the angle is not critical as long as it is sufficient to separate the direct heating effects of the upper face 76 from the base 74 and thence from the surface 34. A lower face 80 is angled upwardly from the base 74 from a base trailing edge 82 separated from the base leading edge 78, so that there is a gap 84 between the lower face 80 and the surface 34 of the article 20. The gap reduces heat transfer from the weld lift-off block 70 to the base metal of the article being welded. (In other embodiments of the weld lift-off block, such as will be discussed in relation to FIG. 8, there is no gap 84.)

The weld lift-off block 70 is positioned with the base leading edge 78 immediately adjacent to the effective article lift-off region 72, and held in place by the tack-welded strip 73. The effective article lift-off region 72 is the point at which the direct heating of the heat source 32 is removed from the article 20 being welded. By "direct" heating is meant the region which is immediately heated from the heat source 32 without substantial diffusion of the thermal energy through other, intermediate structure or pieces.

A weld pool is formed on the surface of the article by direct heating of the article by the heat source 32, numeral 54. The weld pool is usually first formed at the first location at which the crack is to be repaired, numeral 86 in FIG. 5. Additional filler metal, preferably but not necessarily of the same composition as the base metal of the article 20, is preferably, but not necessarily, fed into the weld pool in order to fill the void 30a.

During the welding operation of steps 54–58, the article 20 being welded may be intentionally heated by a heater other than the heat source 32 to a temperature greater than room temperature, or it may remain unheated, and at nearly room temperature, except for the heating from the heat source 32. General heating of the article to a temperature to a moderately high temperature has proved effective during weld repair of some superalloys, particularly those which have limited ductility at temperatures near to their melting points.

The heat source 32 is translated horizontally along the surface 34 relative to the article 20, in a relative direction of movement along the length of the weldment to be formed, numeral 56, as indicated by the arrow 88 in FIGS. 5 and 6. The heat source may be moved and the article held stationary, the heat source may be stationary and the article moved, or a combination of the two. The heat source 32 is translated along the surface 34 of the article 20 toward the effective lift-off region 72. The translation of the heat source 32 is continued past the effective lift-off region 72 and onto the upper face 76 of the weld lift-off block 70 by crossing the base leading edge 78, without discontinuing the direct heating of first the article 20, and then the weld lift-off block 70, by the heat source 32. The continuous heating of the article 20, as the heat source 32 passes the effective lift-off region 72, avoids the production of most repair-induced cracks when the base metal and the filler metal, if any, cools and solidifies. The "effective" lift-off region is so-named because the heat source 32 is removed from direct heating of the surface 34 of the article 20, without disrupting the regular lateral flow of heat, and while gradually decreasing the heat input to the surface 34.

Thereafter, the heating with the heat source 32 is discontinued only after the heat source 32 is directly heating the upper face 76 of the weld lift-off block 70, and not the article 20. That is, the power to the heat source 32 is turned off, or the heat source 32 is lifted away, only after the heat source 32 has moved past the base leading edge 78 and so that its heat is directed onto the weld lift-off block. This location is the actual lift-off location 90, different from the effective lift-off location 72. Any repair-induced cracking in the material at the actual lift-off region 90 is in the weld lift-off block 70, which cracking is not of concern because it is not in the article being welded.

The final repaired article 20 is illustrated in FIG. 7. A relatively uniform solid weldment 92 extends along the region which was previously cracked, from the first location 86 to the effective lift-off region 72.

The article is given optional final processing, numeral 63. Such final processing 60 may include removal of any artefacts of the welding, such as any excess material left over from the welding, and cleanup of the surface 34. The final processing 60 may also include any post-welding heat treatment of the article.

The final processing 60 may also include any required repairs of small cracks or other defects remaining after the weld repair. There may be a small number of small cracks in the weldment 92, or laterally adjacent to the weldment in the article 20. These small cracks may be on the front side of the article 20, from which the welding occurs, or the back side opposite the front side if the article 20 is thin. These cracks are typically quite small and few in number, if present at all. They may be repaired with known techniques suitable for filling small defects, such as activated diffusion clad(ling (ADC), activated diffusion healing (ADH), or the LPM™ process. See, for example, Keith A. Ellison et al., "Low Cycle Fatigue Properties of LPM™ Wide-Gap Repairs in Inconel 738", Superalloys 1996, Proc. of the Eighth International Symposium on Superalloys, Minerals, Metals & Materials Society, page 763 (1996).

FIG. 8 illustrates another embodiment of the weld lift-off block, denoted by numeral 70'. This weld lift-off block 70' has a base 74', an upper face 76', and a base leading edge 78' comparable to those of the weld lift-off block 70 of FIGS. 5 and 6, and those corresponding descriptions are incorporated here. The weld lift-off block 70' differs in that it has no lower face 80 and no gap 84.

Figure 9:
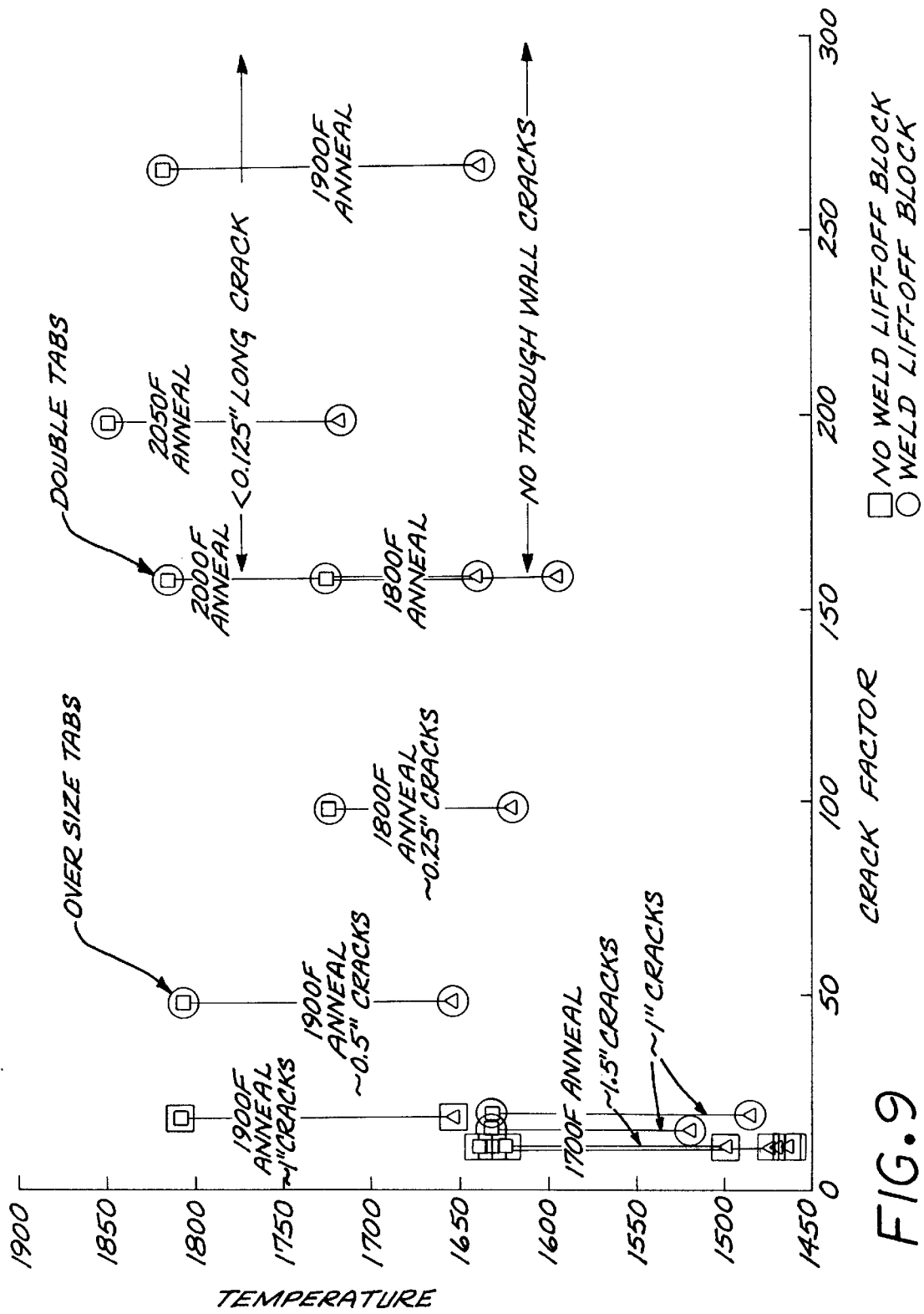
FIG. 9 is a graph of temperature versus crack factor, showing the results for tests performed with and without using the weld liftoff block of the invention.

The present approach using the weld lift-off block has been comparatively tested with a similar approach that does not utilize the weld lift-off block, for the weld repair of Rene' 108 test coupons. Specimens were weld repaired by heating the specimen to elevated temperature, performing the weld repair at elevated temperature, post-weld annealing, and then inspecting the specimens after cooling to room temperature. FIG. 9 summarizes the results of the tests. The temperature of the weld repair is indicated on the vertical axis, with a range for each test indicating the temperature at the beginning and at the end of the weld repair procedure. The post-weld annealing temperature is also indicated. The horizontal axis is the Crack Factor, defined as (1/number of cracks×maximum crack length)× 100. The larger the Crack Factor, the fewer the number of cracks and the smaller the crack size, the desired result. Tests performed without the use of the weld lift-off block, whose results are found on the left-hand side of FIG. 9, produced a relatively large number of cracks and large cracks. Tests performed with the use of the weld lift-off block, whose results are found further to the right in FIG. 9, produced a relatively small number of cracks and small cracks. The optimum approach, found in the four right-most data sets, all utilized the weld lift-off block and resulted in cracks having a maximum length of about ⅛ inch which did not penetrate through the thickness of the specimen.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of forming a weldment that terminates within the perimeter of an article, comprising the steps of:
   furnishing an article having a surface;
   positioning a weld lift-off block at a location on the surface of the article, the weld lift-off block having a wedge shape comprising
      a base contacting the surface of the article, and
      an upper face angled upwardly from the base from a base leading edge;
   forming a weld pool on the surface of the article by directly heating the surface of the article using a heat source;
   moving the heat source relative to the surface of the article and onto the upper face of the weld lift-off block by crossing the base leading edge, without discontinuing the direct heating of the article by the heat source; and
      discontinuing the heating with the heat source only after the heat source is directly heating the upper face of the weld lift-off block, and not the article.

2. The method of claim 1, wherein the portions of the article remote from the heat source are not intentionally heated.

3. The method of claim 1, wherein the portions of the article remote from the heat source are intentionally heated.

4. The method of claim 1, wherein the article has a melting temperature, and wherein the weld lift-off block is made of a material having a melting temperature not substantially less than that of the article.

5. The method of claim 1, wherein the weld lift-off block is affixed to the surface of the article.

6. The method of claim 1, wherein the step of forming a weld pool includes the step of starting the weld pool at a location separated from the weld lift-off block.

7. The method of claim 1, wherein the weld lift-off block further comprises a lower face angled upwardly from the base from a base trailing edge separated from the base leading edge, so that there is a gap between the lower face and the surface of the article.

8. The method of claim 1, wherein the article is selected from the group consisting of a nickel-base alloy, a cobalt-base alloy, an iron-base alloy, a titanium-base alloy, and an intermetallic.

9. The method of claim 1, including an additional step, after the step of discontinuing the heating, of closing a repair-induced crack remaining on the surface of the article.

10. The method of claim 1, wherein the heat source comprises a source of an electric arc.

11. The method of claim 1, wherein the heat source comprises a source of combustible gas.

12. A method of forming a weldment that terminates within the perimeter of an article, comprising the steps of:

furnishing a nickel-base superalloy article having a surface;

positioning a weld lift-off block at a location on the surface of the article, the weld lift-off block being made of a material having a melting temperature not substantially less than that of the article, the weld lift-off block having a wedge shape comprising a base contacting the surface of the article, an upper face angled upwardly from the base from a base leading edge, and a lower face angled upwardly from the base from a base trailing edge separated from the base leading edge, so that there is a gap between the lower face and the surface of the article;

forming a weld pool on the surface of the article by directly heating the surface of the article using a heat source;

moving the heat source relative to the surface of the article and onto the upper face of the weld lift-off block by crossing the base leading edge, without discontinuing the direct heating of the article by the heat source; and discontinuing the heating with the heat source only after the heat source is directly heating the upper face of the weld lift-off block, and not the article.

13. The method of claim 12, wherein the portions of the article remote from the heat source are not intentionally heated.

14. The method of claim 12, wherein the portions of the article remote from the heat source are intentionally heated.

15. The method of claim 12, wherein the step of forming a weld pool includes the step of starting the weld pool at a location separated from the weld lift-off block.

\* \* \* \* \*